Figure 13:
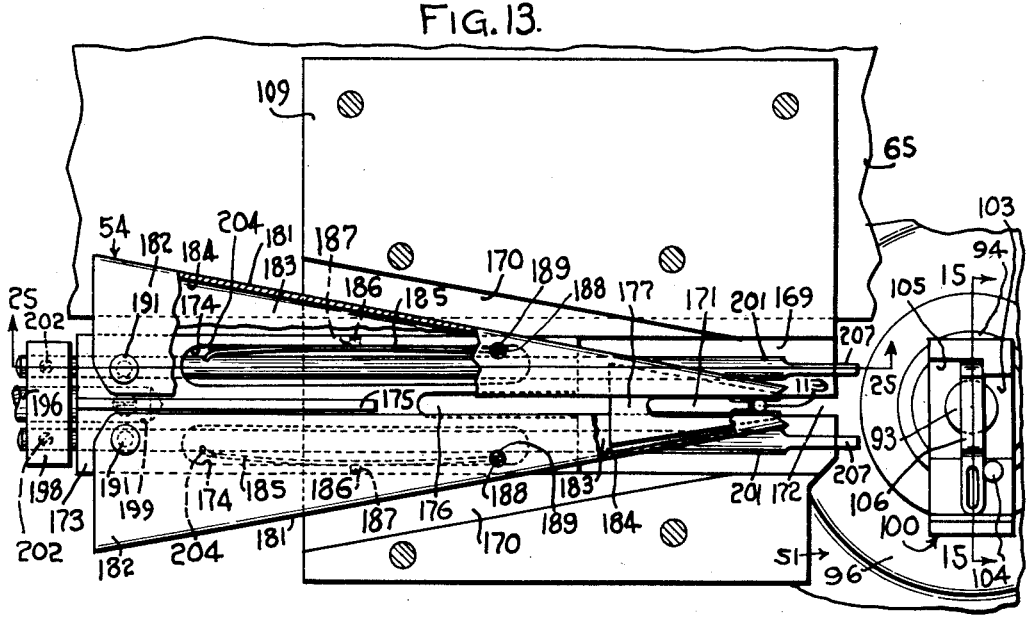

Sept. 29, 1959     A. C. PETERS     2,906,334
ASSEMBLY APPARATUS
Filed May 2, 1956                                 8 Sheets-Sheet 1
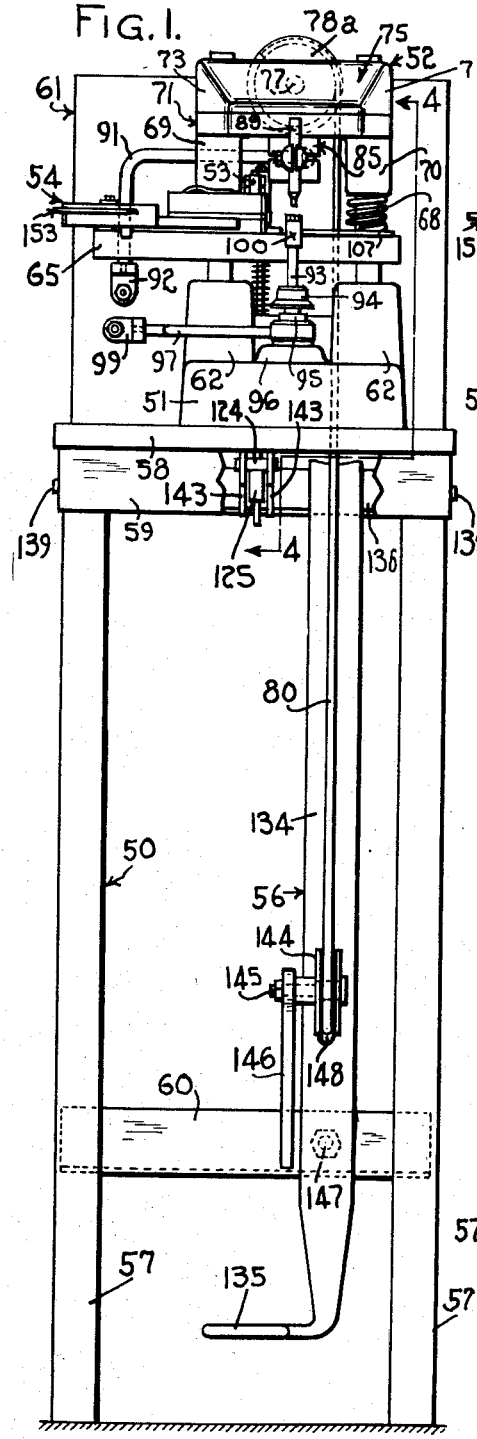
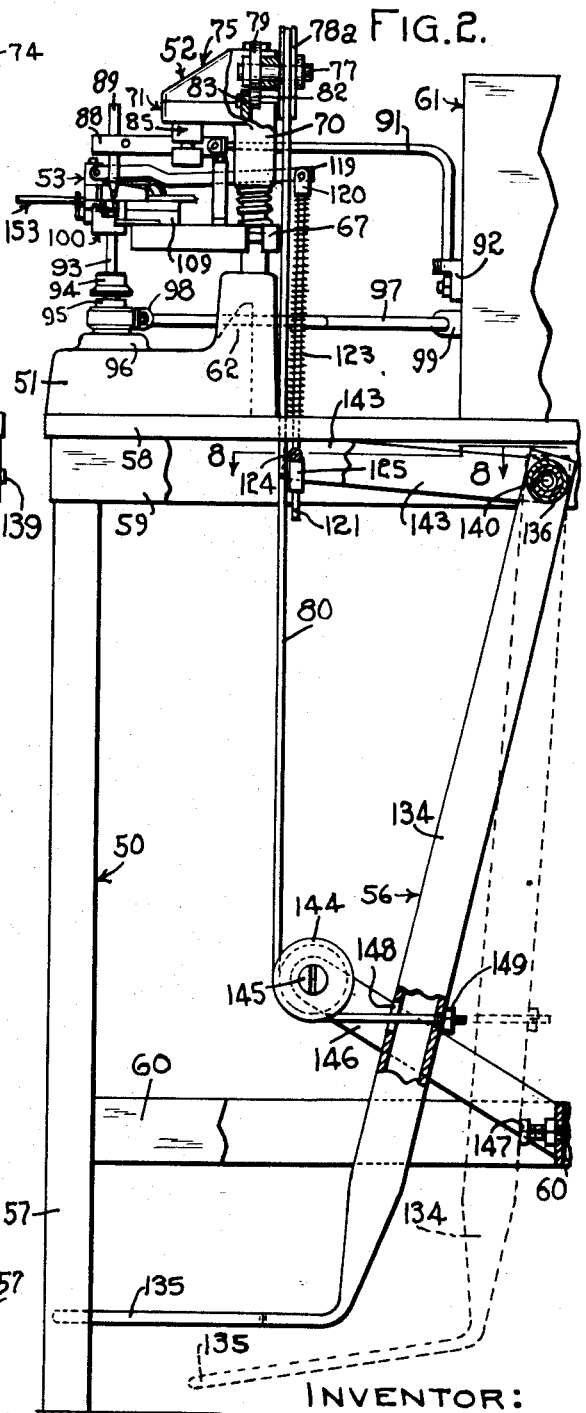
INVENTOR:
ARTHUR C. PETERS,
BY John Todd
ATTORNEY.

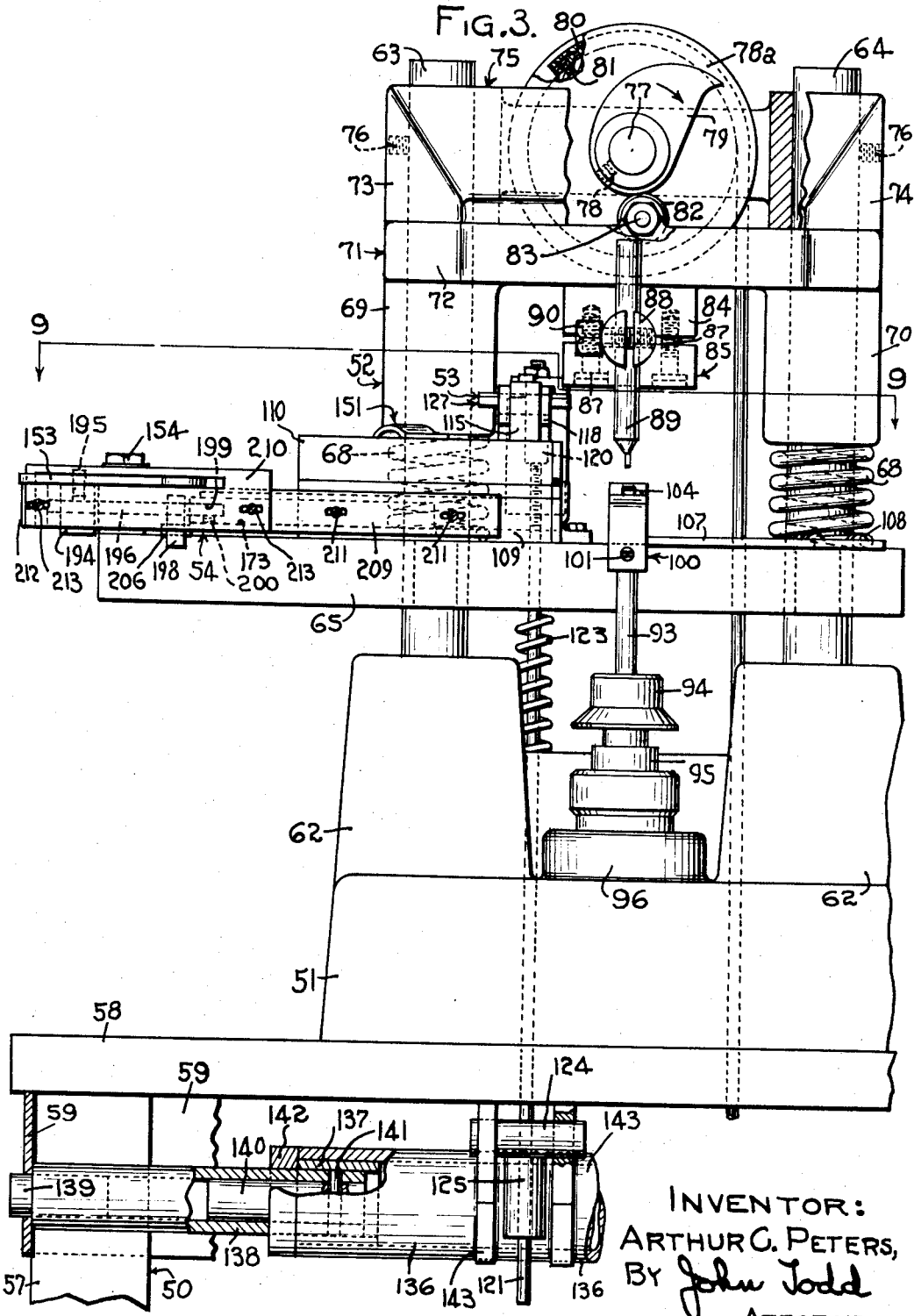

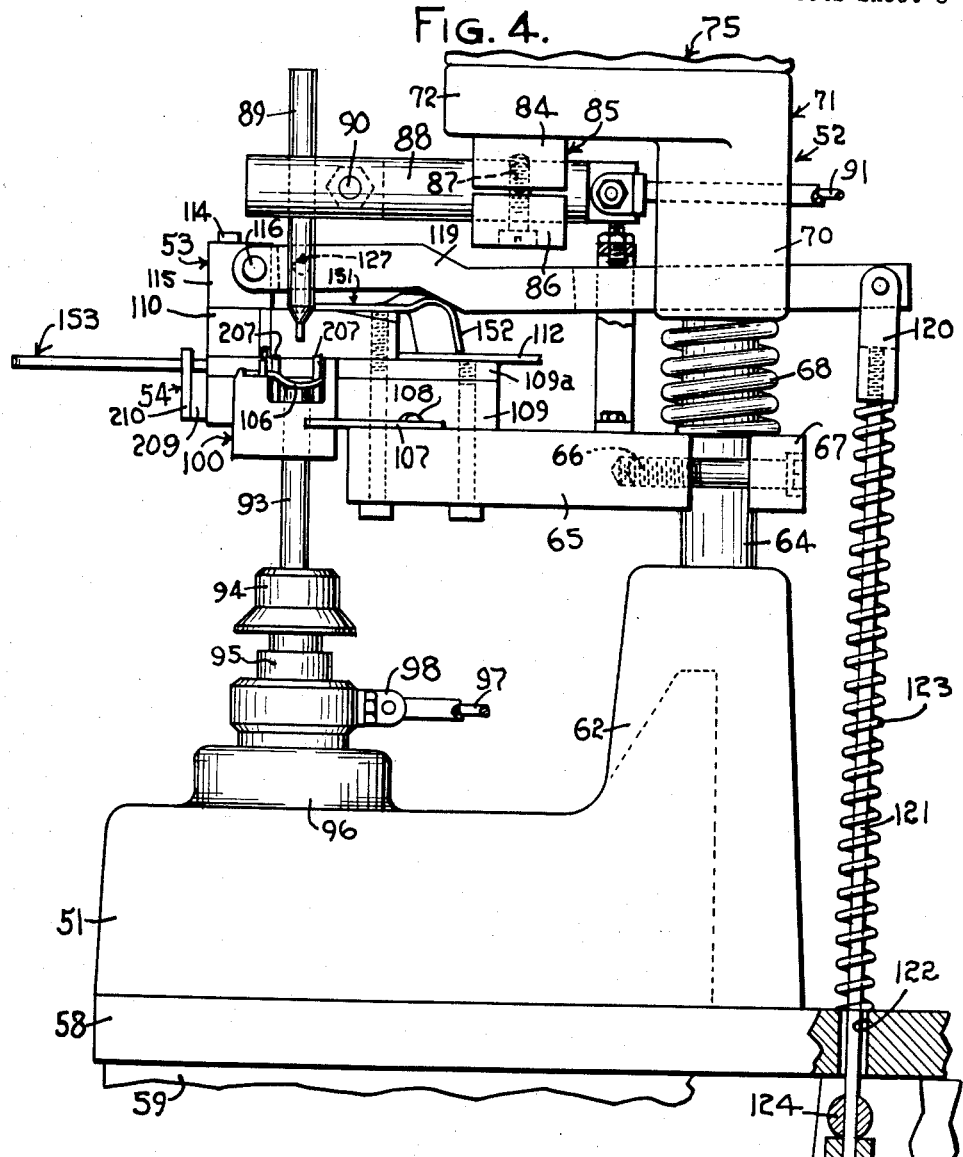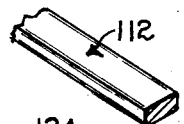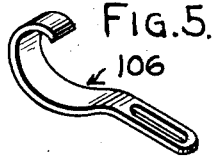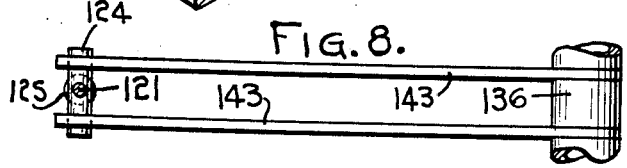

Sept. 29, 1959     A. C. PETERS     2,906,334
ASSEMBLY APPARATUS
Filed May 2, 1956     8 Sheets-Sheet 4
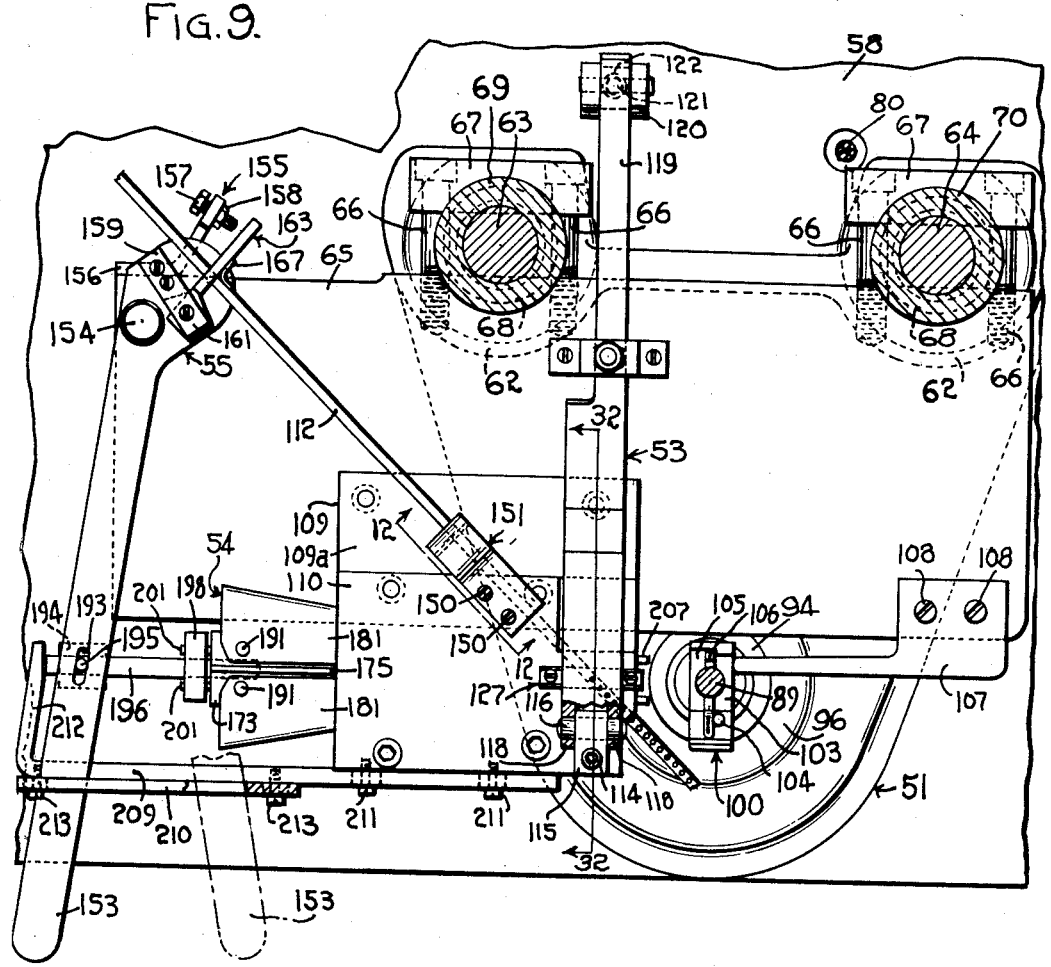
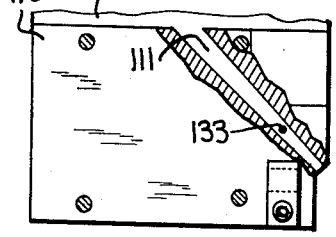
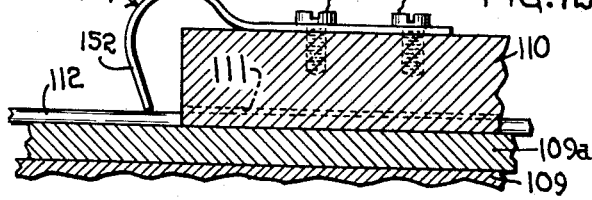
INVENTOR:
ARTHUR C. PETERS,
BY John Todd
ATTORNEY.

Sept. 29, 1959 A. C. PETERS 2,906,334
ASSEMBLY APPARATUS
Filed May 2, 1956 8 Sheets-Sheet 5

INVENTOR:
ARTHUR C. PETERS,
BY John Todd
ATTORNEY.

Sept. 29, 1959   A. C. PETERS   2,906,334
ASSEMBLY APPARATUS
Filed May 2, 1956   8 Sheets-Sheet 6
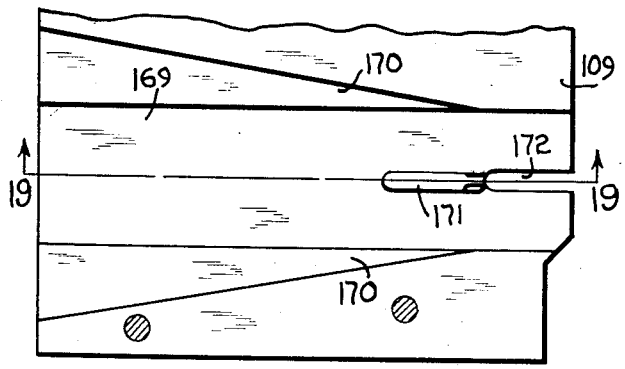
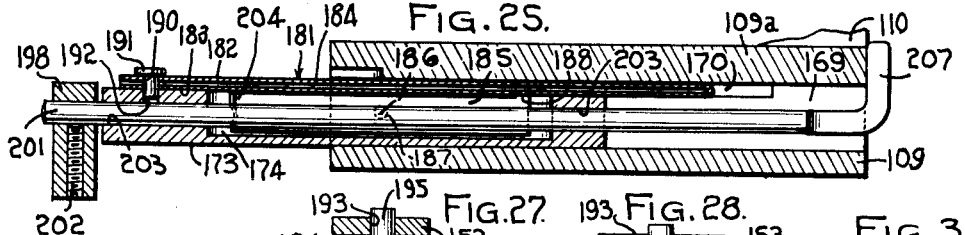
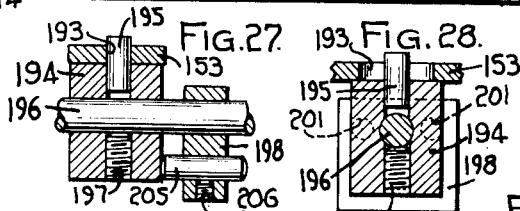
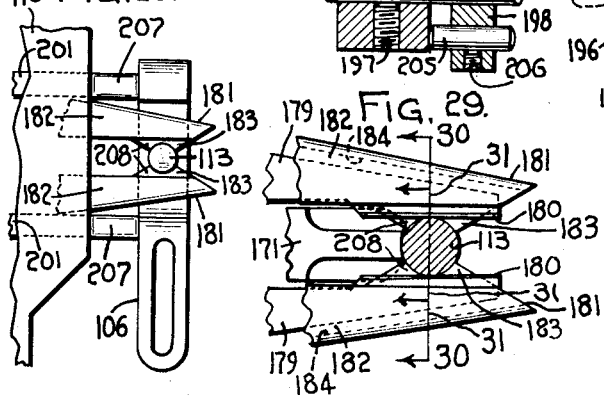
INVENTOR:
ARTHUR C. PETERS,
BY John Jodd
ATTORNEY.

Sept. 29, 1959 A. C. PETERS 2,906,334
ASSEMBLY APPARATUS
Filed May 2, 1956 8 Sheets-Sheet 7
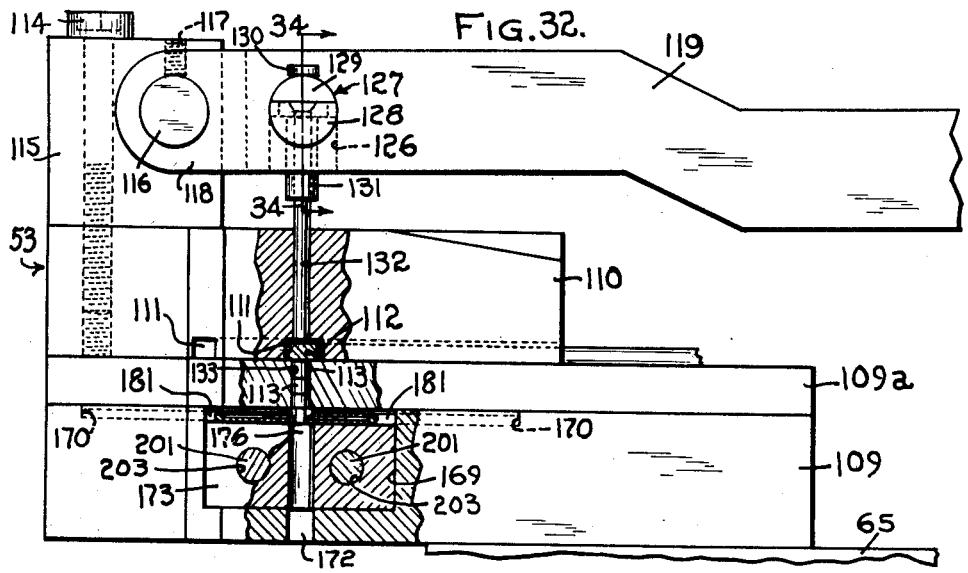
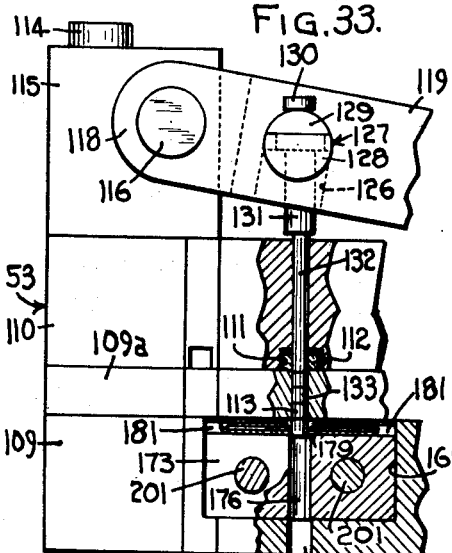
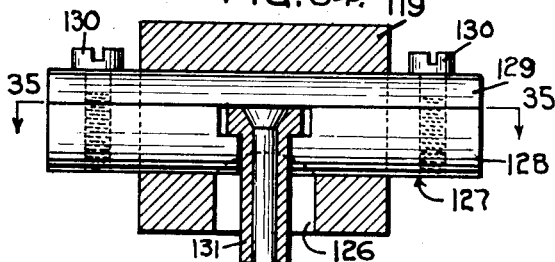
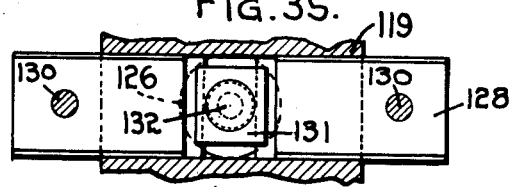
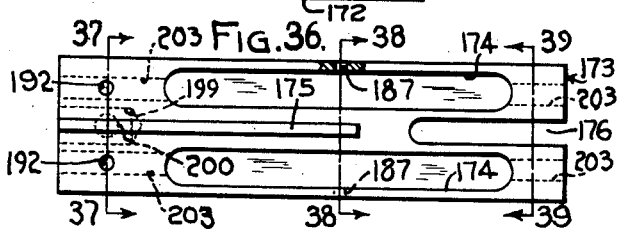
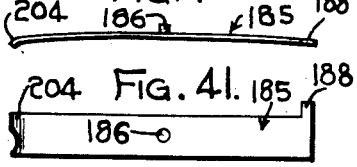
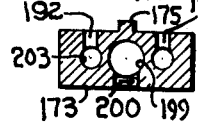
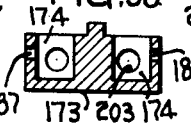
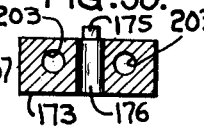
INVENTOR:
ARTHUR C. PETERS,
BY John Todd
ATTORNEY.

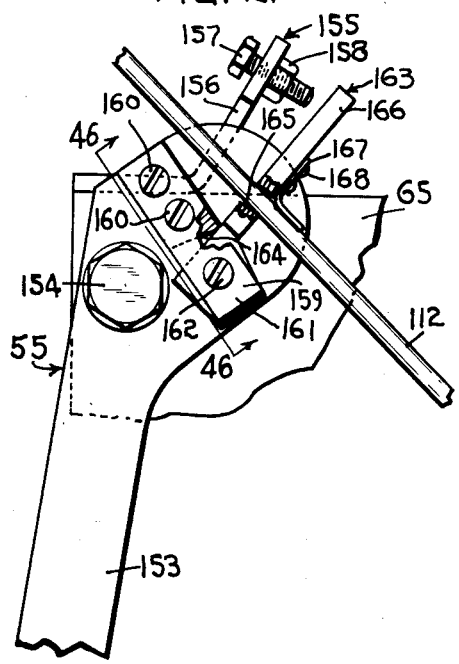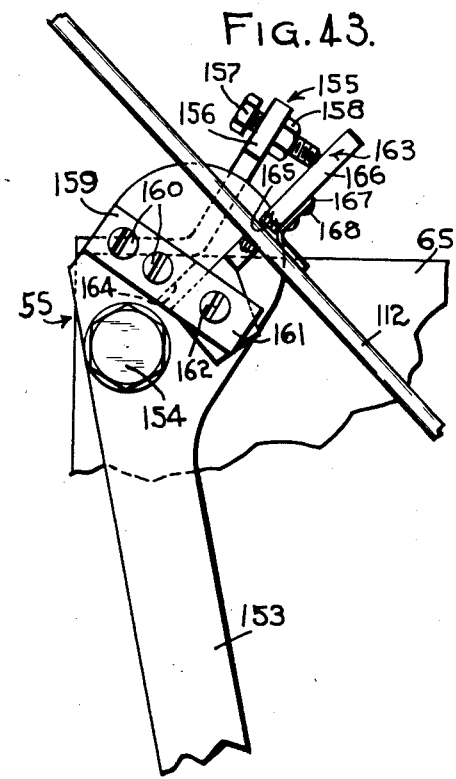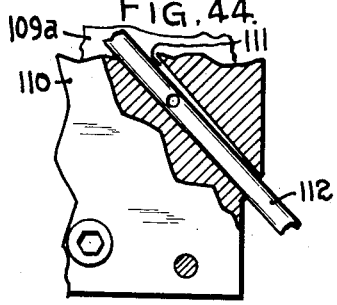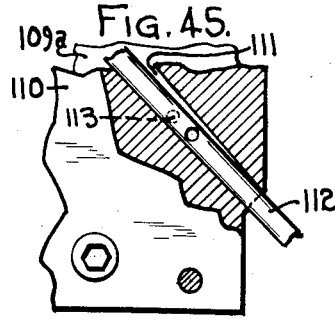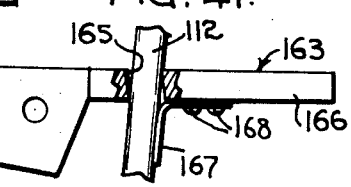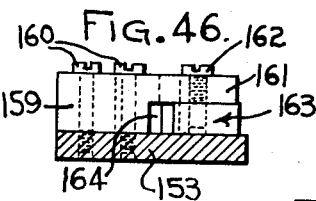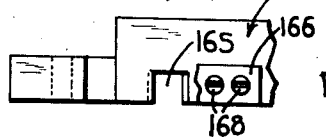

United States Patent Office 2,906,334
Patented Sept. 29, 1959

2,906,334

ASSEMBLY APPARATUS

Arthur C. Peters, Midlothian, Ill., assignor, by mesne assignments, to United-Carr Fastener Corporation, Boston, Mass., a corporation of Delaware Application May 2, 1956, Serial No. 582,171

13 Claims. (Cl. 164—88)

This invention relates to assembly apparatus that is operative to prepare, position, hold and weld together certain components of an assembly. The apparatus is particularly useful in the manufacture of contact elements used as connectors in electrical plugs.

In the manufacture of terminals that are used in high quality electrical plugs, it is desirable to provide apparatus that performs most of the assembly functions, for in this manner the human element is substantially minimized whereby an article of high quality is produced consistently. Furthermore, the use of such assembly apparatus facilitates manufacture and enables a relatively large volume production to be maintained while the cost per article is held to a minimum.

It is, accordingly, an object of this invention to provide assembly apparatus capable of achieving the advantageous results set forth above. Another object of the invention is in the provision of assembly apparatus that functions to prepare or form certain components of an assembly, to position the components so that they may be united, and to hold the properly positioned components during the uniting thereof which is brought about in a welding operation. Still another object is that of providing a welding apparatus having utility in the assembly of a contact terminal with a contact point or boss, and in which the point is punched from a continuous strip, is advanced into position upon the contact terminal, and is held in predetermined position during a welding operation which rigidly and permanently affixes the contact point to the terminal.

Still another object is that of providing assembly apparatus of the character described wherein the contact point is punched from a continuous or endless wire at the same time that the welding head is in operative position to secure a previously punched point to a contact terminal, and wherein the same movement that releases the welding head at the conclusion of its operation also advances a continuous wire into position to have another contact point punched therefrom during a subsequent welding operation. A further object is to provide in apparatus of this character, cooperative finger elements, certain of which receive and hold the contact point following the punching thereof from a continuous wire so that such contact point may be picked up by other finger elements and advanced into a predetermined position wherein the point is welded to a contact terminal. Yet a further object is to provide spring fingers shiftable between a retracted position wherein they are conditioned for receiving a contact point held in position for that purpose by holder fingers, and an extended position wherein they carry a contact point to a predetermined location wherein it can be welded to a contact terminal— the movable spring fingers and stationary holder fingers being slidably interconnected, and the movable spring fingers being equipped with positioning members that are effective to readily hold a contact terminal while a contact point is located with respect thereto, and while welding electrodes are brought into positive engagement with the contact terminal and contact point in preparation for welding the same together. Additional objects and advantages will become apparent as the specification is developed.

An embodiment of the invention is illustrated in the accompanying drawings, in which—

Figure 1 is a front view in elevation of the assembly apparatus; Figure 2 is a side view in elevation of the apparatus; Figure 3 is an enlarged broken front view of the apparatus similar to that of Figure 1, and in which certain portions of the structure have been broken away to show hidden components; and Figure 4 is an enlarged broken vertical sectional view taken along the line 4—4 of Figure 1.

Figure 5 is a perspective view of a contact terminal which is one component of the assembly made by the machine; Figure 6 is a perspective view of a contact point which is the other component of the assembly made by the machine; Figure 7 is a broken perspective view showing the flat wire strip from which the contact points illustrated in Figure 6 are punched; and Figure 8 is a longitudinal sectional view taken along the line 8—8 of Figure 2.

Figure 9 is a longitudinal sectional view taken along the line 9—9 of Figure 3; Figure 10 is an end view in elevation of certain components of the apparatus as viewed from the left in Figure 9; Figure 11 is a top plan view with portions being shown in section of one of the components illustrated in Figures 9 and 10; and Figure 12 is a sectional view that is taken along the line 12—12 of Figure 9.

Figure 14:
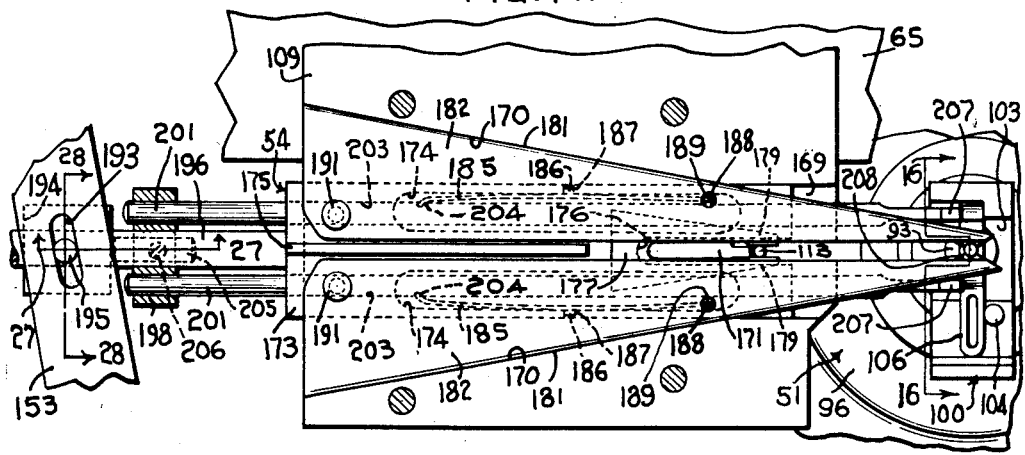
Figure 15:
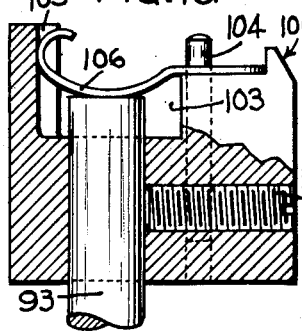
Figure 16:
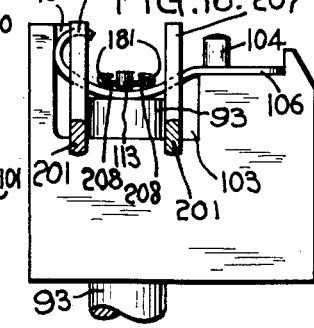
Figure 17:
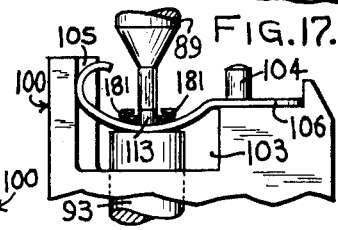

Figure 13 is an enlarged top plan view of one of the operational assemblies shown in Figure 9, and in which portions of that assembly are illustrated in section; Figure 14 is a broken top plan view similar to that in Figure 13, but showing elements of that operational assembly in shifted position; Figure 15 is a sectional view taken along the line 15—15 of Figure 13; Figure 16 is a view in section taken along the line 16—16 of Figure 14; and Figure 17 is a sectional view similar to that of Figure 16, but showing a further stage in the operation of the apparatus.

Figure 18 is a broken top plan view of one of the elements illustrated in Figures 13 and 14; Figure 19 is a longitudinal sectional view taken along the line 19—19 of Figure 18; Figure 20 is a top plan view of one of the components illustrated by dotted lines in Figures 13 and 14; Figure 21 is a longitudinal sectional view showing the component illustrated in Figure 20 in position in the apparatus; Figure 22 is a broken side view in elevation of the assembly illustrated in Figure 21; Figure 23 is a top plan view of one of the spring fingers which are shown in Figures 13 and 14; Figure 24 is a section viewed along the line 24—24 of Figure 23; Figure 25 is a longitudinal sectional view taken along the line 25—25 of Figure 13; Figure 26 is a broken top plan view of the spring fingers placing the contact point in position on a contact terminal in preparation to a welding operation; Figure 27 is a sectional view taken along the line 27—27 of Figure 14; Figure 28 is a transverse sectional view taken along the line 28—28 of Figure 14; Figure 29 is a broken top plan of the spring fingers picking up a contact point in another of its positions; Figure 30 is a sectional view taken along the line 30—30 of Figure 29; and Figure 31 is a sectional view showing a contact point being received by the holding fingers illustrated in Figure 20, and which is viewed generally along the line 31—31 of Figure 29.

Figure 32 is a broken transverse sectional view as seen along the line 32—32 of Figure 9; Figure 33 is a sectional view similar to that of Figure 32, but showing the punch actuating lever in depressed position; Figure 34 is a vertical sectional view taken along the line 34—34 of Figure 32; Figure 35 is a longitudinal sectional view taken along the line 35—35 of Figure 34; Figure 36 is a top plan view of the transfer block which is shown in section in Figure 25; Figures 37, 38 and 39 are transverse sectional views taken along the correspondingly designated lines in Figure 36; Figure 40 is a top plan view of a leaf spring used in conjunction with the transfer block of Figure 36; Figure 41 is a side view in elevation of the spring shown in Figure 40.

Figure 42 is an enlarged plan view in detail of one of the components otherwise seen best in Figure 9; Figure 43 is a top plan view similar to that of Figure 42, but showing the operating lever thereof in a shifted position; Figure 44 is a broken top plan view partly in section of the guide block illustrated in Figure 9; Figure 45 is a top plan view partly in section identical to Figure 44 except that it shows the continuous flat wire in a shifted position; Figure 46 is a sectional view taken along the line 46—46 of Figure 42; Figure 47 is a top plan view of the feed block showing the endless strip in position therein; and Figure 48 is a broken side view in elevation of the feed block, looking from the bottom and toward the top of Figure 47.

*General description*

The assembly apparatus comprises a stand or support table 50 having positioned thereon a base 51 that carries a welding head 52. A punch assembly 53 also comprises a part of the apparatus and is integrally carried by the base 51. A feed and positioner assembly 54 and the stock feeder 55 (Figure 9) are also components of the apparatus supported integrally by the base 51. Actuation of the apparatus is controlled manually in the specific illustration given by a treadle assembly 56.

The support table 50 is exemplary only of a number of different support arrangements that may be provided for the apparatus, and in the illustration has a plurality of legs 57, a table top 58, depending skirt braces 59 that reinforce the connection of the top to the legs, and transverse supports 60 located adjacent the lower ends of the legs.

In a sequence of operations carried out by the apparatus, an endless flat wire is advanced by the assembly 55 into the punch structure 53, and when the treadle 56 is depressed a small slug or contact point is punched from the continuous wire. At the same time, the feed assembly 54 has advanced a previously punched contact point into position beneath the welding head 52 and over a contact member to which it is to be secured. When the treadle is depressed, the electrodes of the welder are brought into engagement with the terminal and contact point and the two are welded together. These operations are then carried on repeatedly—each time the treadle is depressed, a contact point is welded to a contact terminal while another contact point is being punched from the flat wire. Similarly, when the feed and positioning assembly is actuated, it advances a contact point into position for a welding operation, while the flat wire stock is advanced into the punch assembly. All of these operations will be brought out in greater detail hereinafter as the various components of the assemblies are described more fully.

*Welding head*

With the exception of the electric power source that provides the requisite current and voltage to carry forth a welding operation, and which is designated in Figures 1 and 2 with the numeral 61, the welding head can be described best by reference to Figures 3 and 4. Referring then to those figures, it is seen that the base 51 is provided with a pair of upwardly extending portions 62 that are spaced apart and that have rigidly secured therein a pair of cylindrical standards or posts 63 and 64. Rigidly secured to the posts is a platform 65 by means of cap screws 66 that are threadedly received within the platform and that pass through appropriate slots extending transversely across the posts. As is most evident from Figure 9, a pair of cap screws are provided for each of the posts, and the heads of the cap screws seat within lock bars 67 that extend across the rear of the posts in generally parallel alignment with the platform 65 and seat within slots for that purpose provided in the posts. The platform 65 is slightly narrower than the base 51, as is apparent from Figure 4, but is somewhat longer than the base 51, as is seen in Figure 3.

Above the platform 65, each of the posts carries a coil spring 68 that seats on the upper surface of the platform. The upper ends of the springs 68 engage the depending legs 69 and 70 of a yoke, which is designated generally with the numeral 71 and has a transverse or horizontal connector section 72 extending between the legs and secured thereto. The legs 69 and 70 are slidable vertically along the posts 63 and 64.

Rigidly secured to the posts 63 and 64 above the legs 69 and 70 are the legs 73 and 74 of an inverted U-shaped support member 75. These legs are fixedly secured to the posts by means of set screws 76.

Rotatably journaled in appropriate bearings carried by the U-shaped support 75 is a shaft 77, having secured at its forward end by means of a set screw 78, a cam 79. Rearwardly of the support 75, the shaft 77 carries a sheave or pulley wheel 78a that has a cable 80 riding in the channel thereof, and that is affixed at its end within the channel by means of a screw 81 which is threaded into the pulley wheel. It will be clear that the pulley wheel, shaft and cam are rotated when the cord or cable 80 is moved downwardly. The cam 79 rides on a cam follower 82 that is rotatably mounted upon a stub shaft 83 fixed to the cross piece 72 of the yoke 71. As the cam rides in a clockwise direction, as viewed in Figure 3, it pushes the cam follower 82 downwardly, as well as the yoke 71 that carries the same, against the biasing action of the springs 68.

The horizontal portion 72 of the yoke 71 carries a jaw 84 that provides one of the jaws of a support assembly 85. The other jaw 86 is secured beneath the jaw 84 and in parallel alignment therewith by cap screws 87 (Figure 4). The jaws 84 and 86 have semi-cylindrical channels extending transversely thereacross in alignment with each other, and seated within these channels is a tubular electrode carrier 88 that is bifurcated at its forward end and formed with a passage therethrough that slidably receives the electrode 89. The set screw 90 extending through the bifurcated end of the holder 88 is adjustable to selectively position the electrode 89. As is apparent from Figures 1, 2 and 4, the electrode carrier 88 has a lead wire 91 secured to the rear end thereof, and that wire leads to a terminal 92 on the electrical supply assembly 61.

Positioned beneath the electrode 89, which is the movable electrode, is a stationary electrode 93 that is supported by an air bellows 94 positioned on a support boss 95, which in turn is mounted on a raised portion or boss 96 provided by the base 51. The electrode 93 is electrically connected to the supply device 61 through a lead 97 connected thereto at a terminal 98 and by a terminal 99 that leads in through the support boss 95 and bellows 94 to the electrode.

The bellows is adapted to provide a yieldable mounting for the stationary electrode 93 so that that electrode may yield downwardly slightly when a force is applied to the upper end thereof so as to maintain the forces exerted between the electrodes 89 and 93 at a uniform value.

That is to say, irrespective of the magnitude of the force that causes the electrode 89 to move downwardly, the resultant force between the electrodes will always be at some predetermined value. It has been found that with an arrangement of this kind, a pressure of about ten pounds per square inch in the bellows is sufficient to provide the desired welding force between the electrodes. The pressure of the bellows may be maintained by supplying air thereto when necessary, as is well known in the art.

The electrode 93 passes through a support anvil 100, the details of which are shown in Figures 15 through 17. It is there apparent that a set screw 101 secures the anvil to the electrode.

As is most apparent from the detailed showing in Figures 15 through 17, the anvil 100 has a recess 103 therein at the point where the electrode 93 passes therethrough. The anvil is equipped with a stop post 104 along one side of the recess and with a flange 105 or cut-out portion that provides the flange which serves as a stop post along the other side of the recess. Adapted to be positioned within the anvil 100 is a contact terminal 106 having a configuration such that a portion thereof rests on the anvil in the area thereof adjacent the post 104, while the central portion thereof is positioned on the electrode 93. Longitudinally, the contact terminal 106 is aligned or is adapted to be aligned by the stops 104 and 105. It is seen in Figure 9 that a guide 107 secured to the platform 65 by screws 108 abuts the anvil 100 along one side thereof so as to prevent shifting thereof in one lateral direction, or toward the right as viewed in Figure 9.

In operation of the welding head, the cord or cable 80 is pulled downwardly (as seen in Figure 3) by means that will be hereinafter described, when the treadle 56 is depressed. That movement of the cord will rotate the shaft 78 and the cam 79 connected therewith. The cam follower 82 will then force the welding electrode 89 downwardly to bring it in welding engagement with the work pieces positioned in the anvil 100. If the downward force of the electrode 89 is too great, the air support within the bellows 94 for the electrode 93 will permit it and the anvil to yield downwardly slightly until only such force of a magnitude that has been predetermined will exist between the electrodes. When the cord 80 is released, the springs 68 will force the yoke 71 upwardly so as to return the welding electrodes to their predetermined position.

It should be brought out that the welding head herein described is exemplary only of a number of different types of welding heads that can be employed, some of which are commercially available, as for example the Raytheon weld power head, model 1–L–S. Such heads will be equipped with switching means that energize the power supply when the welding electrodes are brought into engagement. It will be apparent that for safety reasons, it may be desirable to employ a number of switches, one of which serves as a safety switch so as to make sure that the power supply is energized before a welding operation only upon intention of an operator and not inadvertently.

*Punch or contact former*

The punch assembly which forms the contact points is seen best in Figures 3, 4 and 32 through 35, and reference will now be made to those figures in particular.

The platform 65 carries a transfer block 109 that has a feed block 110 supported thereon. The feed block 110 has a slot 111 extending angularly therethrough adapted to slidably receive a flat wire strip 112. The strip 112 will ordinarily be copper, and is intended to have contact points 113 (Figure 6) punched therefrom.

Secured to the feed block 110 by an elongated cap screw 114 is a support block 115. The block 115 has a pivot shaft 116 extending therethrough that is locked within the block to prevent longitudinal movement by set screw 117. The pivot shaft 116 extends outwardly on each side of the block 115 and pivotally carries the bifurcated ends 118 of a lever arm 119 that, as is seen in Figure 4, has a U-shaped link 120 connected to the rear end thereof. The link 120 threadedly receives the end of a rod 121 that passes through an opening 122 in the table top 58. An elongated coil spring 123 surrounds the rod 121, and at one end seats on the upper side of the table top and at its other end seats against the link 120 so as to normally bias the lever arm 119 upwardly, or in a counter-clockwise direction as viewed in Figure 4. The lower end of the rod 121 passes through a pin 124 and is held in position with respect to the pin by a lock block 125, also received on the rod. The pin 124 is secured to the treadle assembly which will be described in the subsequent section.

The lever arm 119 has a transverse passage extending therethrough and an elongated recess 126 that communicates with and extends downwardly from the passage, as is shown best in Figure 34. Rotatably carried in the passage is a floating pivot pin 127 formed in sections 128 and 129 that are secured together by cap screws 130. The cap screws extend along the sides of the arm 119 for the pin 127 projects outwardly on each side of the lever arm. The section 128 of the pin is formed in two parts which are recessed at their inner or adjacent ends in line with the recess 126 so as to receive the head of a sleeve 131 that extends downwardly through the recess 126. Carried in the sleeve is a punch 132 that extends downwardly through a passage provided for that purpose in the feed block 110.

The transfer block 109 may be formed in two parts, and the upper part or surface portion 109a thereof is positioned beneath the feed block 110 and has an opening 133 therethrough that is in line with the punch 132. The channel 111 passes beneath the punch 132 and above the opening 133 so that the flat wire 112 passes between the opening and the punch.

In operation of the punch assembly, downward pivotal movement of the lever arm 119, or movement in a clockwise direction about the pivot pin 116, causes the punch 132 to move downwardly and into engagement with the wire 112 positioned there-beneath. Continued downward movement of the lever arm forces the punch through the flat wire so that a slug or contact point is forced into the opening 133 in the transfer block. It is seen in Figure 32 that the upper section 109a of the transfer block has sufficient thickness so as to receive a plurality of contact points therein—in fact, three in number in the illustration given. In will be apparent by comparing Figures 32 and 33 that the punch 132 remains perpendicular with respect to the transfer block 109 as the lever arm 119 pivots about the axis of the pivot pin 116. This perpendicularity is afforded because the pin 128 which carries the punch floats freely within the transverse passage through the lever arm. At the same time, however, the direction of force application to the punch is along the longitudinal axis thereof because the upper end of the punch bears against the pin which is cylindrical and therefore engages the lever arm 119 along a line contact, irrespective of the position of the lever arm. The coil spring 123 forces the lever arm upwardly to withdraw the punch when the treadle is released.

*Treadle apparatus*

The treadle comprises an elongated bar or channel 134 that at its lower end is provided with a foot pedal 135 that, as seen in Figure 1, is offset laterally from the plane of the channel. At its upper end, the channel is rigidly secured to a tube 136 (Figure 3) that encloses a sleeve 137 that is mounted upon an elongated tube 138 equipped at its outer ends with bearing members 139 in the form of a pin that is journaled within the skirt brace 59 of the support table. The tube 138 receives centrally a shaft 140 and is secured thereto by pins 141. The sleeve 137 and tube 136 are locked against relative movement with respect to the tube 138 so that the entire assembly rotates about the axes of the bearing members 139. If desired, clamp collars 142 may be provided about the tube 138 in abutting engagement with the sleeve 137 and outer tube 136.

Extending forwardly from the outer tube 136 are a pair of arms 143 that are spaced apart, and at their forward ends carry the pin 124, which is seen most clearly in Figure 4. With this arrangement, when pressure is applied to the foot pedal 135 the channels 134 pivot about the bearing members 139 to swing the arms 143 downwardly, or in a counter-clockwise direction, to pull the rod 121 downwardly and actuate the punch. When pressure is removed from the pedal 135, the spring 123 returns it as well as the lever arm 119 to its normal position.

Adjacent, but spaced above, the table support members 60 is a pulley wheel or sheave 144 that is rotatably carried by a pivot screw 145 extending through a support bracket 146 secured by welding or otherwise to the table, and more particularly to the support struts 60 thereof. A bolt 147 acts as an adjustable stop for bar 134. Passing over the pulley wheel 144 is a cable 80 which was referred to in the description of the welding head. The cable 80 passes through an enlarged opening 148 in one side of the channel member or bar 134, and also through the other side thereof and is locked to that side by a washer or nut 149 that is secured thereto and that bears against that side of the channel or bar. Therefore, when the treadle is pivoted upon the application of pressure to the foot pedal 135 thereof, and into the position shown by dotted lines in Figure 2, the cord 80 is pulled downwardly so as to actuate the welding head in the manner heretofore described.

*Wire feeder*

The contact points 113 are punched from a continuous flat copper wire 112 in a manner heretofore described in detail. The wires 112 must be fed into the punch assembly in a step-by-step fashion so that, repetitiously, subsequent areas along the wire are positioned below the punch for preparation to having the contact point punched therefrom. The wire feeding or advancing assembly will now be described, and in this description particular attention will be given to Figures 9 through 12 and 42 through 48.

As was brought out in the description of the punch assembly, the wire 112 passes along the upper surface of the transfer block 109, and it passes through a slot formed in the feed block 110. That slot, as is seen in Figures 11, 44 and 45, has been designated with the numeral 111. The feed block 110 has secured to the upper surface thereof by cap screws 150 a spring 151 that has an arcuate and forwardly angled end portion 152 that extends downwardly generally along the rear face of the feed block and into engagement with the wire 112 that is passing through the feed block. The inclination of the end 152 is forwardly, or in a direction of the path of advance of the wire 112. It will be apparent that the spring forms a type of one-way clutch or a check that permits the wire 112 to move forwardly in its advance of travel, but prevents the wire from moving rearwardly because of the frictional grip that develops between the spring which bears downwardly on the wire and the surface of the transfer block 109a which engages the underside of the wire.

The wire 112 is advanced upon movement of the manually operable handle or lever arm 153 which pivots along the plane of the platform 65, and generally along the longitudinal axis of the transfer block 109. The handle 153 has an enlarged end portion that is apertured to receive a bolt 154 which passes therethrough and is threaded into the platform 65. The bolt 154 is normal to the platform and to the handle, and it provides the pivotal axis for the handle.

The platform 65 is equipped with an adjustable stop 155 adjacent the enlarged portion of the handle 153, and the stop comprises a bracket 156 that is rigidly secured to the platform along one leg thereof and angles outwardly and rearwardly therefrom. The angular end portion of the bracket threadedly receives a bolt 157 therein that may be adjustably positioned with respect to the bracket, and is maintained in any selected position by a lock nut 158. As is most apparent from Figure 46, the handle 153 has a mounting block 159 rigidly secured thereto by cap screws 160. The block has an extension 161 projecting therefrom that is spaced above the handle, and is apertured to threadedly receive a cap screw 162 that provides a pivotal mounting for a feed member 163 that is interposed between the handle and the extension 16. The feed member is free to pivot with respect to the handle. However, the block 159 has an inclined edge interposed beneath the extension 161, and the corner of that edge forms an abutment 164 adapted to engage the feed member 163, as is shown most clearly in Figure 42. When the handle is swung in a clockwise direction, the edge 164 abuts the feed member 163, as viewed in Figures 42 and 43. However, when the handle 153 is swung in a counter-clockwise direction, as viewed in those same figures, the abutment edge 164 is withdrawn from the feed member 163 so that it remains stationary as the handle moves.

The feed member 163 is provided with an opening 165 that passes through the arm 166 thereof, and that opening or aperture is inclined slightly so that the longitudinal axis thereof is not normal to the arm. The opening is slightly enlarged, however, so that the wire 112 can pass therethrough. Adjacent the opening 165 is an L-shaped spring 167, one leg of which is rigidly secured to the arm 166 by screws 168. The other leg extends forwardly of the arm 166, as is apparent from Figure 47, and it engages a longitudinal edge of the wire 112.

The operation of the feed assembly is as follows: Initially, the arm 153 is in the position shown in Figures 9 and 42, and when it is grasped it is swung toward the right, or in a counter-clockwise direction. Movement in this direction tends to cause the wire 112 to move rearwardly, but such movement thereof is inhibited by the check stop or spring 151. The feed member 163, while being pivotal with respect to the arm 153 and beneath the extension 161 of the mounting block, is frictionally gripped between these members so that counter-clockwise movement of the handle 153 causes the feed member, and especially the arm 163 and spring 167 thereof, to move rearwardly along the wire. The spring is curved rearwardly so that little frictional resistance is afforded to such relative movement between the spring and wire. Such movement of the feed member continues until the arm 163 thereof abuts the bolt 157, which then terminates the reverse movement of the feed member even though the handle 153 continues to be swung in a counter-clockwise direction. Ultimately, the abutment edge 164 of the mounting member is moved free of the feed member so that a space exists therebetween, as is shown in Figure 43.

After the punching and welding operations have been carried out, the handle 153 is returned to its initial position by moving it in a clockwise direction. Such movement brings the abutment edge 164 into engagement with the feed member 163, as shown in Figure 42, so that the feed member is moved forwardly or generally in a clockwise direction along with the handle. This movement pinches the wire 112 between the spring 167 and the upper and lower opposite corners of the openings 165, as shown in Figure 47, so that the wire is pushed forwardly by that movement of the feed member. Thus, a subsequent or unpunched portion of the wire is moved into position below the punch 132. This sequence of operations is repeated each time the handle 153 is moved.

*The transfer or contact point advancing and holding assembly*

The figures which show this assembly in greatest clarity are 9, 10, 13 through 30 and 36 through 41, and these are the figures to which reference will now be made.

The transfer block 109, as is shown in Figures 18 and 19, has a channel 169 formed therein that runs longitudinally therethrough. The channel 169 is relatively deep and has along the longitudinal edges thereof inclined recesses 170 which are formed along the upper surface of the transfer block 109 proper, but below the cover surface portion 109a thereof (Figure 32). The recesses 170 form a generally V-shaped configuration with the widest portions thereof being adjacent the rear edge of the transfer block, and they converge therefrom toward the forward end of that block but merge with the channel 169 a spaced distance from the forward end thereof. The recesses 170 are relatively shallow, as is apparent from Figure 19. Extending upwardly from the bottom of the channel adjacent the forward end thereof, is a guide member 171 that is located in the forward portion of the channel. Forwardly of the guide member is a slot 172 that terminates adjacent the guide member and extends forwardly therefrom to the free end of the channel.

Slidably mounted within the channel 169 is a sliding block 173 that has a pair of longitudinally extending openings 174 formed therein. Rising upwardly from the sliding block 173 is a spacer rib 175 that extends along the longitudinal axis thereof rearwardly from about the midpoint of the block. Also extending along the longitudinal axis of the sliding block, forwardly of the rib 175 and commencing a spaced distance therefrom, is an elongated slot 176 that is adapted to receive a guide member 171 of the channel 169 therein. Figure 25 shows the sliding block 173 in position within the channel 169.

After the sliding block is in position within the channel 169, a gripper or holder member 177 is adapted to extend partially thereover and is provided with a slot 178 therein that receives the guide member 171 of the channel therein, as is seen best in Figures 21 and 22. The channel 178 is defined by bifurcating the forward end portion of the gripper member 177 so that in effect it provides a pair of spaced gripper fingers 179, the rear portions of which define the slot 178. As is best shown in Figure 31, the forward surfaces of the gripper fingers 179 are beveled, as at 180, so that a contact point 113 can be fed downwardly between the fingers to be frictionally gripped thereby in a manner that will be described hereinafter.

Gripper member 177 is adapted to be slidably received within the feeder or advance fingers 181 (Figures 23 and 24). A pair of fingers 181 are provided and these fingers are each triangular in shape so that they can be slidably received within the recesses 170 of the transfer block. Each of the fingers 181 is formed by folding over a piece of metal so as to define a generally U-shaped arrangement having legs 182 and 183 that form a channel 184 therebetween. The gripper member 177 is adapted to be slidably received within the channels 184 of the advancer fingers 181, and is slidable relatively freely with respect thereto. Figures 13, 14 and 29 show this mounting of the advancer fingers and gripper member most clearly.

The spring advancer fingers are spring biased inwardly by means of leaf springs 185 which are shown most clearly in Figures 40 and 41. The leaf springs 185 are elongated and are provided centrally with a boss or protuberance 186 that is adapted to extend through an opening 187 therefor formed in the outer wall of the slide block channels 174, as is seen in Figure 14. The leaf springs 185 at their forward end have formed integrally therewith an upwardly exending projection 188 that is received within an aperture 189 provided for that purpose in the advancer fingers 181. The configuration of the leaf springs 185 is such that they bias the forward ends of the fingers 181 inwardly or toward each other, so that those fingers are conditioned for gripping the contact point 113, as is shown in Figures 26, 29 and 30.

The spring fingers at their rear inner edges are provided with an aperture 190 therein that receives a pivot pin 191, that in turn is secured within an opening 192 formed in the slide block 173. The pivot pins 191 hold the fingers 181 in position, but permit those fingers to be pivoted inwardly about the axes of those pins under the biasing action of the leaf springs 185. The spaced rib 175 is interposed between the fingers 181, as is shown best in Figure 14, to limit the inward movement thereof brought about by the biasing springs.

The slide block 173 and fingers 181 carried thereby are reciprocated through the channel 169 upon movement of the handle 153. The handle 153, as is seen most clearly in Figures 9, 14, 27 and 28, is provided with an elongated slot 193 that extends generally along the longitudinal axis thereof. Positioned below this slot in the handle is a drive block 194, having a pin 195 embedded therein and that extends upwardly therefrom and through the slot 193. The driving block 194 has a transversely extending bore therethrough that receives the rod 196. The rod 196 is locked in position with respect to the drive block by a set screw 197. With this arrangement, movement of the handle causes the drive block 194 to move forwardly, which in turn causes forward movement of the rod 196. The rod 196 passes through a bore provided for that purpose in a driven block 198, and after passing through that driven block extends through a passage 199 in the slide block 173. The rod is rigidly secured to the slide block 173 by a set screw adapted to be threadedly received within an aperture 200 provided for that purpose (Figures 36 and 37). Thus, when the rod 196 is reciprocated, the slide block 173 is reciprocated as well as the advance fingers 181 carried thereby.

The driven block 198 has a pair of apertures formed therein that lie in a plane cutting across the block at the elevation of the rod 196. These apertures receive pusher rods 201 therein, and the rods are rigidly secured with respect to the driven block by set screws 202. Thus, because of their connection with the driven block 198, the pusher rods 201 must move in unison. These rods slidably pass through longitudinally extending passages 203 formed in the slide block 173 in a generally parallel relation with the bore 199. The passages 203 pass through the elongated slots 174 in the slide block, as is shown best in Figures 36 and 38. As is seen in Figure 14, the leaf springs 185, and particularly the inwardly turned end 204 thereof, slidingly and frictionally engages the push rods 201. These push rods are free to move through the slide block 173 within the limits of free movement that are afforded by the frictional grip of the leaf springs with those push rods.

Figure 27 as well as Figure 14 show that the driven block 198 has a drive pin 205 extending therethrough that is locked in position by a set screw 206. The pin 205 is aligned with the lower portion of the drive block 194 so that it can be abutted thereby. Therefore, as is apparent from Figure 14, as the handle 153 is moved toward the right, the drive block 194 is brought into engagement with the pin 205 so as to move it forwardly along with the slide block 173. When the handle 153 is moved in the reverse direction, the inwardly turned ends 204 of the leaf springs bite into the push rods 201 and cause the same to move rearwardly with the slide block.

The push rods 201 extend completely through the slide block 173 and are substantially longer than that block. They also extend forwardly of the transfer block 109, as is seen in Figure 25, and at their forward ends are turned upwardly to form holders or presser members 207. As is apparent from Figure 26, the holder or presser members 207 are adapted to be brought into engagement with a contact terminal 106 that has been placed within the anvil 100 in preparation to having a contact point positioned thereon.

The fingers 181 are adapted to pick up from the gripper member 177 a contact point 113 held thereby, and advance that point into a position over the contact terminal 106, as is shown in Figure 26. For this purpose, the lower leg 183 of each of the fingers 181 is enlarged slightly to provide pick-up points 208, each of which has an arcuate or concave portion that conforms to the cylindrical shape of a contact point. The enlargements 208 are adapted to be slid about a contact point 113 when the fingers are moved forward, to resiliently grip the contact point received therebetween and withdraw it from the grip of the holder member 177 as the fingers 181 continue to move forwardly. The fingers can be withdrawn from the contact point after the same is held against the contact terminal 106 upon closing of the welding electrodes 89 and 93.

The handle 153 reciprocates through a pair of stop members, one of which is generally L-shaped and is designated with the numeral 209 and the other designated with the numeral 210. The stops are seen best in Figures 3 and 9, the latter in particular. The stop 209 is generally L-shaped and the long or base leg thereof is secured to the transfer block 109 by means of screws 211. The angular end 212 thereof extends rearwardly and in line with the rod 196 that extends through the drive block 194. Thus, when the handle is swung to the left as viewed in Figure 9, its movement is limited by abutment of the rod 196 with the end 212 of the stop member. Preferably, the stop 209 is provided with elongated slots or apertures for receiving the screws 211 so that the stop member can be shifted to provide selective adjustment for the point of abutment thereof with the rod 196.

Forward movement of the handle 153 or movement thereof in a counter-clockwise direction is limited by the stop 210 that slidably receives the same. Preferably, that stop is adjustably carried by the base leg of the stop member 209 by means of providing the stop member 210 with elongated apertures therethrough that receive the screws 213 that secure it to the base leg.

Operational summary

To condition the apparatus for operation, appropriate connections will be made to the power supply 61 so that when the switches controlling the same are closed, welding current and voltage will be delivered to the electrodes 89 and 93. Further, a continuous wire strip 112 will be threaded through the feed assembly and to a position beneath the punch 132. The apparatus will be in the condition illustrated in Figures 1, 2, 3, 4, 9 and 32, with the handle or manually operable lever 153 swung to the left or clockwise position, and the treadle 56 released. The punch 132 is raised and the welding electrodes are separated.

The first operation is to swing the handle 153 toward the right as viewed in Figure 9, which will have the effect of pushing the spring advance fingers 181, and the slide block 173 that carries the same, forwardly. This movement will cause the pick-up enlargements 208 of the spring fingers to slide over a contact point 113 that is, at this time, frictionally gripped and held stationary by the gripper member 177, as is seen in Figures 29 and 30. As the spring fingers move forwardly, they ultimately bring the contact point picked up thereby into a position over the contact terminal 106 that has been placed within the anvil or holder member 100. At the same time, the push rods 201 have been shoved forwardly until the holder ends 207 thereof press against the contact terminal 106 and lock it against the stop members 104 and 105.

Next, the treadle assembly 56 is actuated by depressing the foot pedal 135 thereof which causes the welding electrodes 89 and 93 to close and to tightly grip the contact terminal 106 and contact point 113, as is shown in Figure 17. The closing of the electrodes may energize the power source for the welding operation, and the contact terminal and contact point will be welded together.

Preferably, however, the apparatus is provided with a switch that may be arranged with an automatic counter, for example, and which must be manually actuated apart from the depressing of the pedal 135. If such a switch is provided (one is not shown since an arrangement of this character is well known in the art, and a detailed description thereof is unnecessary for that reason, and would unduly lengthen the description), the handle is moved slightly to the left, as viewed in Figure 9, to withdraw the spring fingers 181 from the contact point 113, which at such time is held by the electrodes. Thereafter, the additional switch is energized to complete the welding operation. This arrangement is preferred for it has been found that the welding between the contact terminal and point is of a better quality, which it is believed results because of the elimination of magnetic fields that might be provided about the work members during the welding thereof if the spring fingers remained in position thereabout.

The downward pressure on the foot pedal 135 which causes the electrodes to close, also causes the punch 132 to be depressed and to punch out a contact point from the wire 112, as is shown in Figure 33. The punch penetrates the wire completely and forces the removed contact point into the opening provided in the transfer block 109, or more particularly into the opening provided by the cover plate or upper surface portion 109a thereof. As is seen in Figure 33, a plurality of contact points are carried within that opening, and as an additional contact point is pushed thereinto by the punch, one that has been previously cut from the wire is forced downwardly and into the frictional grip of the spring-fingered gripper member 177.

When the treadle is released, the springs 68 and the spring 123 force the electrodes to separate and the punch to be elevated, which frees the apparatus so that the handle 153 can be returned to its initial position. Such return movement of the handle advances the wire 112 so that a subsequent portion thereof is positioned beneath the punch in preparation for the next punching operation.

Return movement of the handle 153 which causes the slide block 173 and spring fingers 181 to be returned, moves the holder members 207 from engagement with the contact terminal 106 so that the contact terminal with the contact point welded thereon can be removed from the anvil or holder 100. Because of the inwardly turned ends 204 of the leaf springs 185, the holder members move rearwardly or to starting position with the slide block to immediately clear them of the contact terminal. However, movement in the other direction of the slide block may not be accompanied by simultaneous movement to the same extent of the push rods and holder members because relative movement of the slide block in that direction is permitted by the inwardly turned ends of the leaf springs. Therefore, there may be some lagging of the holder members behind the advancer fingers 181.

Since the adjustments that provide the operator with control over the apparatus—namely, the adjustment shown best in Figures 42 and 43 for controlling the extent to which the wire 112 is advanced on each movement of the handle 153, and the extent of movement of the handle in either direction, as well as the yieldable fluid pressure support for the electrode 93—have all been described before in detail, they will not be again repeated. It will be apparent that the wire 112 may be fed from a roll supported in any appropriate manner. The punched end portion of the strip of wire which, as is shown in Figure 9, advances angularly past the welding apparatus, may be removed in any suitable manner as, for example, simply by breaking it off when it becomes excessively long.

While in the foregoing specification an embodiment of the invention has been set forth in considerable detail for purposes of completely disclosing the same, it will be apparent that those skilled in the art may make numerous changes in those details without departing from the spirit and principles of the invention.

I claim:
1. In apparatus wherein contact points are struck from a continuous strip of wire preparatory to a welding operation wherein the contact points are welded to contact terminals, a contact former comprising a platform, a transfer block carried by said platform and being provided with a channel therein adapted to pass a wire strip therethrough, a punch aligned with said channel, and means for depressing said punch to strike contact points from a wire strip within said channel, said platform having a passage therein for receiving contact points struck from a wire strip in a punching operation.

2. The apparatus of claim 1 in which said means for depressing said punch comprises a pivotally supported lever arm having a passage extending transversely therethrough, a fulcrum pin mounted within said last mentioned passage for pivotal movement, and in which said punch is secured to said fulcrum pin and is depressed thereby, rotational movement of said fulcrum pin being effective to orient the depressing force applied to said punch upon pivotal movement of said lever arm along the longitudinal axis of the punch.

3. In apparatus wherein contact points are struck from an endless wire strip advanced in step-by-step fashion into a contact former, means for feeding a wire strip in step-by-step increments comprising a feed block having a channel therein adapted to pass a wire strip therethrough, friction clutch means carried by said block operative to constrain movement of a wire strip in reverse direction while affording relatively free movement thereof in the opposite direction, a pivotally supported arm equipped with a feed clutch adapted to receive a wire strip therein and being operative to grip such a strip upon movement of said arm in one direction to advance such strip but affording relatively free movement of said arm in the opposite direction without movement of such strip in a reverse direction.

4. The apparatus of claim 3 in which said feed clutch comprises a feed member having an opening therethrough for receiving a wire strip, and a spring finger carried by said feed member adjacent the opening therethrough for frictional engagement with a wire strip therein, said feed member being carried by said arm.

5. The structure of claim 4 in which said friction clutch comprises a leaf spring carried by said feed block and having an angularly extending end portion adapted to frictionally engage a wire strip passing through said channel, the angular orientation of that end portion being effective to constrain movement of such a wire strip in a reverse direction while affording movement thereof in the opposite direction.

6. In apparatus wherein a contact point is punched from a wire strip and thereafter is advanced into contiguous relation with a contact terminal preparatory to being welded thereto, punch means for striking contact points from an endless wire, holder fingers disposed beneath said punch means for receiving and holding contact points, movable pick-up fingers for gripping a contact point held by said holder fingers and for removing such contact point therefrom and advancing it to another position, and means for moving said pick-up fingers.

7. The apparatus of claim 6 in which said holder fingers comprise spaced apart stationary spring fingers for receiving a contact point therebetween and for frictionally gripping the same.

8. The apparatus of claim 6 in which said pick-up fingers comprise pivotally mounted finger elements forming together a generally wedge-shaped configuration, a transfer block having a recess therein of complementary wedge-shaped configuration, said finger elements being shiftable longitudinally within said recess wherein they are cammed into convergence about a contact point gripped by said holder fingers, the pivotal axis of said finger elements being adjacent the widest portion of said recess.

9. In transfer apparatus, a transfer block having a recess therein provided with converging side walls, said transfer block having a channel therein lying along the longitudinal axis of said recess, a slide block mounted within and movable through said channel, a pair of pick-up fingers pivotally supported at one end thereof on said slide block, said pick-up fingers having inclined side walls corresponding with those of said recess whereupon movement of the slide block in one direction causes said pick-up fingers to converge, means for reciprocating said slide block within said channel, and a holder member adjacent the point of convergence of said pick-up fingers for holding a contact point for receipt by said pick-up fingers.

10. In contact-forming and advancing apparatus, a transfer block having a channel therein for passing a wire strip therethrough, a punch aligned with said channel for striking a contact point from a wire strip positioned thereunder, means for actuating said punch, said transfer block being provided with an enlarged channel therein disposed below said first mentioned channel, a holder member mounted within said channel and having spring fingers adapted to receive and resiliently grip a contact point struck from a wire strip by said punch, said transfer block having also a recess extending along the longitudinal axis of said enlarged channel and having side walls converging toward said channel, a slide block shiftable longitudinally within said enlarged channel, a pair of pick-up fingers positioned within said recess and having wall portions conforming to the converging side walls thereof, said pick-up fingers each being pivotally supported by said slide block adjacent the end thereof most remote from said punch, and means for reciprocating said slide block within said enlarged channel, said pick-up fingers being constructed and arranged to converge upon and grip a contact point held by said spring fingers for removing the same from the grip thereof.

11. In apparatus of the character described, a contact former comprising a platform, a transfer block carried by said platform and being provided with a channel therein adapted to pass a wire strip therethrough, a punch aligned with said channel, a lever arm having a passage extending transversely therethrough and being supported for pivotal movement with respect to said platform, a fulcrum pin mounted within said passage for pivotal movement about an axis generally parallel to the pivotal axis of said lever arm, said punch being secured to said fulcrum pin so as to be depressed thereby when said lever arm is pivoted in one direction, pivotal movement of said fulcrum pin being effective to orient the force applied to said punch along the longitudinal axis thereof when said lever arm is pivoted in the aforesaid one direction, said platform having a passage therein for receiving contact points struck from a wire strip in a punching operation, holder fingers disposed below said last mentioned passage for receiving and holding contact points passed therethrough, movable pick-up fingers for gripping a contact point so held by said holder fingers and for removing such contact point therefrom to advance the same into a welding station, and means for moving said pick-up fingers to repetitively remove successive contact points from said holder fingers and to advance the same into a welding station.

12. In apparatus of the character described, a contact former comprising a platform, a transfer block carried by said platform and having a recess therein provided with converging side walls, said transfer block having a channel therein extending along the longitudinal axis of said recess and adapted to pass a wire strip therethrough, a punch aligned with said channel, means for depressing said punch to strike contact points from such a wire strip within said channel, a slide block mounted within and being movable through said channel, a pair of pick-up fingers pivotally supported at one end thereof on said slide block, said pick-up fingers having inclined side walls corresponding with those of said recess whereupon movement of the slide block in one direction causes said pick-up fingers to converge, means for reciprocating said slide block within said channel, and a holder member adjacent the point of convergence of said pick-up fingers and aligned with said punch for holding successive contact points struck by said punch from said wire strip for receipt by said pick-up fingers.

13. In apparatus of the character described wherein contact points are struck from a wire strip advanced in step-by-step relation into a contact former, means for feeding a wire strip comprising a feed block having a channel therein adapted to pass a wire strip therethrough, friction clutch means carried by said block and being operative to constrain movement of such a wire strip in reverse direction while affording relatively free movement thereof in the opposite direction, a pivotally supported arm equipped with a feed clutch adapted to receive a wire strip therein and being operative to grip such a strip upon movement of said arm in one direction to advance such strip but affording relatively free movement of said arm in the opposite direction without corresponding movement of such strip, a contact former comprising a platform, a transfer block carried by said platform and being provided with a channel therein adapted to have such a wire strip advanced therethrough by the strip-feeding means, a channel aligned with said last mentioned channel, a punch aligned with said channel, means for depressing said punch to strike contact points from a wire strip within the second mentioned channel, holder fingers disposed below said punch for receiving and holding contact points struck thereby from such a strip in said last mentioned channel, movable pick-up fingers for gripping a contact point held by said holder fingers and for removing such contact point therefrom and advancing it into a welding station, and means for moving said pick-up fingers.

References Cited in the file of this patent
UNITED STATES PATENTS

| | | |
|---|---|---|
| 395,211 | Breul | Dec. 28, 1888 |
| 1,275,984 | Bailey | Aug. 13, 1918 |
| 1,811,832 | Mayers | June 23, 1931 |
| 2,283,629 | Heftler | May 19, 1942 |
| 2,321,788 | Anderson | June 15, 1943 |
| 2,336,662 | Wintriss | Dec. 14, 1943 |
| 2,477,859 | Burge | Aug. 2, 1949 |
| 2,645,365 | Haessler | July 14, 1953 |
| 2,678,722 | Marsilius | May 18, 1954 |
| 2,684,423 | Hipple | July 20, 1954 |
| 2,749,419 | Larsen | June 5, 1956 |
| 2,761,507 | Clarke | Sept. 4, 1956 |
| 2,798,936 | Quinlan | July 9, 1957 |